United States Patent
O'Hagan et al.

(10) Patent No.: US 12,141,528 B2
(45) Date of Patent: Nov. 12, 2024

(54) COMPOSITE EXTRACTION SYSTEMS AND METHODS FOR ARTIFICIAL INTELLIGENCE PLATFORM

(71) Applicant: OPEN TEXT CORPORATION, Waterlo Wa (CA)

(72) Inventors: Paul O'Hagan, Brooklin (CA); Isidre Royo Bonnin, Terrassa (ES); Robert Kapitan, Lachine (CA); Ravinder Reddy Yeddla, Hyderabad (IN); Renaud Levert, Montreal (CA)

(73) Assignee: OPEN TEXT CORPORATION, Waterloo, CA (US)

( * ) Notice: Subject to any disclaimer, the term of this patent is extended or adjusted under 35 U.S.C. 154(b) by 145 days.

(21) Appl. No.: 17/508,820

(22) Filed: Oct. 22, 2021

(65) Prior Publication Data

US 2023/0131066 A1    Apr. 27, 2023

(51) Int. Cl.
*G06F 40/295* (2020.01)
*G06F 16/33* (2019.01)
(Continued)

(52) U.S. Cl.
CPC ........ *G06F 40/295* (2020.01); *G06F 16/3344* (2019.01); *G06F 16/34* (2019.01); *G06F 16/38* (2019.01); *G06F 40/30* (2020.01)

(58) Field of Classification Search
CPC ........ G06F 40/295; G06F 16/38; G06F 16/34; G06F 16/3344; G06F 40/30
See application file for complete search history.

(56) References Cited

U.S. PATENT DOCUMENTS 11,416,754 B1    8/2022    Durvasula et al.
11,481,553 B1    10/2022   Durvasula et al.
(Continued)

FOREIGN PATENT DOCUMENTS

WO    WO2021/016623       1/2021
WO    WO2021195688        10/2021
WO    WO2022133210 A2     6/2022

OTHER PUBLICATIONS

International Search Report and Written Opinion issued by the Canadian Patent Office as the International Searching Authority (CA/ISA) for International PCT Application No. PCT/IB2022/060158, mailed on Mar. 3, 2023, 9 pages.
(Continued)

*Primary Examiner* — Fan S Tsang
*Assistant Examiner* — David Siegel
(74) *Attorney, Agent, or Firm* — SPRINKLE IP LAW GROUP

(57) ABSTRACT

A text mining system providing NLP and NLU capabilities is operable to perform, at a first processing layer, a first operation on input data to produce metadata about the input data. At a second processing layer, a rules module applies a composite AI extraction rule to further process the input data. The composite AI extraction rule has a rule condition that leverages the metadata from the first operation and a rule action that involves a second operation. Other composite AI extraction rules involving multiple text mining operations may also be applied. For instance, a rule may specify using the tonality of a document from a sentiment analysis to classify the document according to a relevant taxonomy. Another rule may specify classifying documents of a particular type under a specific category. In this way, new/ enhanced information about the input data can be deduced, validated, and/or enriched.

30 Claims, 13 Drawing Sheets

(51) Int. Cl.
*G06F 16/34* (2019.01)
*G06F 16/38* (2019.01)
*G06F 40/30* (2020.01)

(56) References Cited

U.S. PATENT DOCUMENTS

| | | | |
|---|---|---|---|
| 2009/0006455 A1* | 1/2009 | Carroll | G06F 16/284 707/999.102 |
| 2019/0197194 A1 | 6/2019 | Larusson et al. | |
| 2019/0294672 A1 | 9/2019 | Matskevich et al. | |
| 2019/0324444 A1 | 10/2019 | Cella et al. | |
| 2020/0265356 A1 | 8/2020 | Lee et al. | |
| 2021/0090555 A1 | 3/2021 | Mahmood et al. | |
| 2021/0158813 A1* | 5/2021 | Sivasubramanian | G06Q 10/107 |
| 2021/0174222 A1 | 6/2021 | Dodwell et al. | |
| 2022/0092056 A1 | 3/2022 | Sekar et al. | |
| 2022/0164397 A1 | 5/2022 | Escalona et al. | |
| 2022/0237368 A1 | 7/2022 | Tran | |
| 2022/0253871 A1 | 8/2022 | Miller et al. | |
| 2022/0319219 A1 | 10/2022 | Tsibulevskiy et al. | |
| 2023/0065223 A1* | 3/2023 | Penneru | G06F 40/216 |
| 2024/0062013 A1 | 2/2024 | O'Hagan et al. | |

OTHER PUBLICATIONS

Office Action issued by the U.S. Patent and Trademark Office for U.S. Appl. No. 17/977,432, mailed Jan. 26, 2024, 32 pages.

International Search Report and Written Opinion issued by the Canadian Intellectual Property Office as the International Searching Authority (CA/ISA) for PCT Application No. PCT/IB2023/060972, mailed Feb. 13, 2024, 15 pages.

International Preliminary Report on Patentability issued by the International Bureau of WIPO as the International Preliminary Searching Authority (CA/ISA) for PCT Application No. PCT/IB2022/060158, mailed May 2, 2024, 8 pages.

Notice of Allowance issued by the U.S. Patent and Trademark Office (USPTO) for U.S. Appl. No. 17/977,432, mailed Aug. 28, 2024, 8 pages.

* cited by examiner

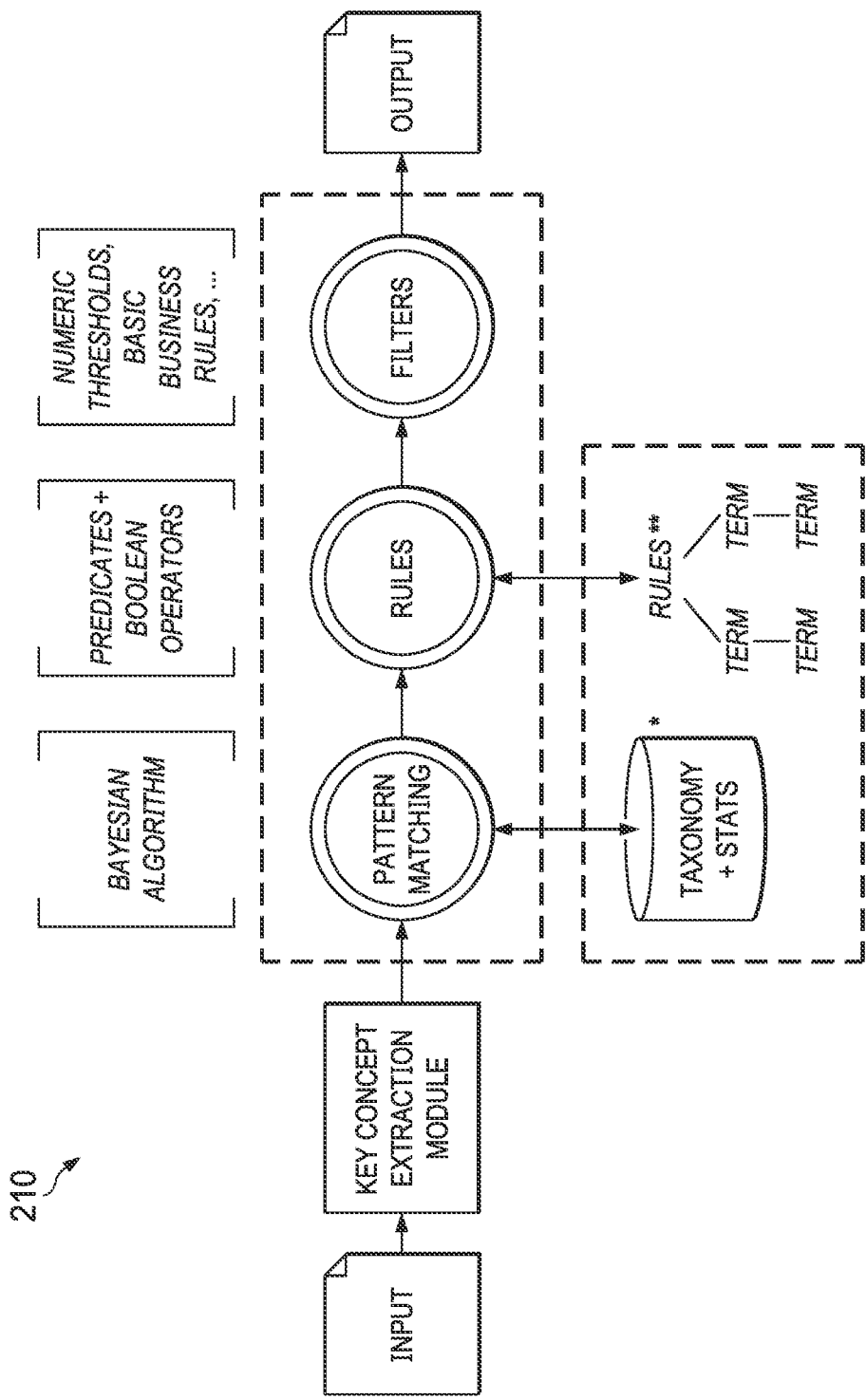

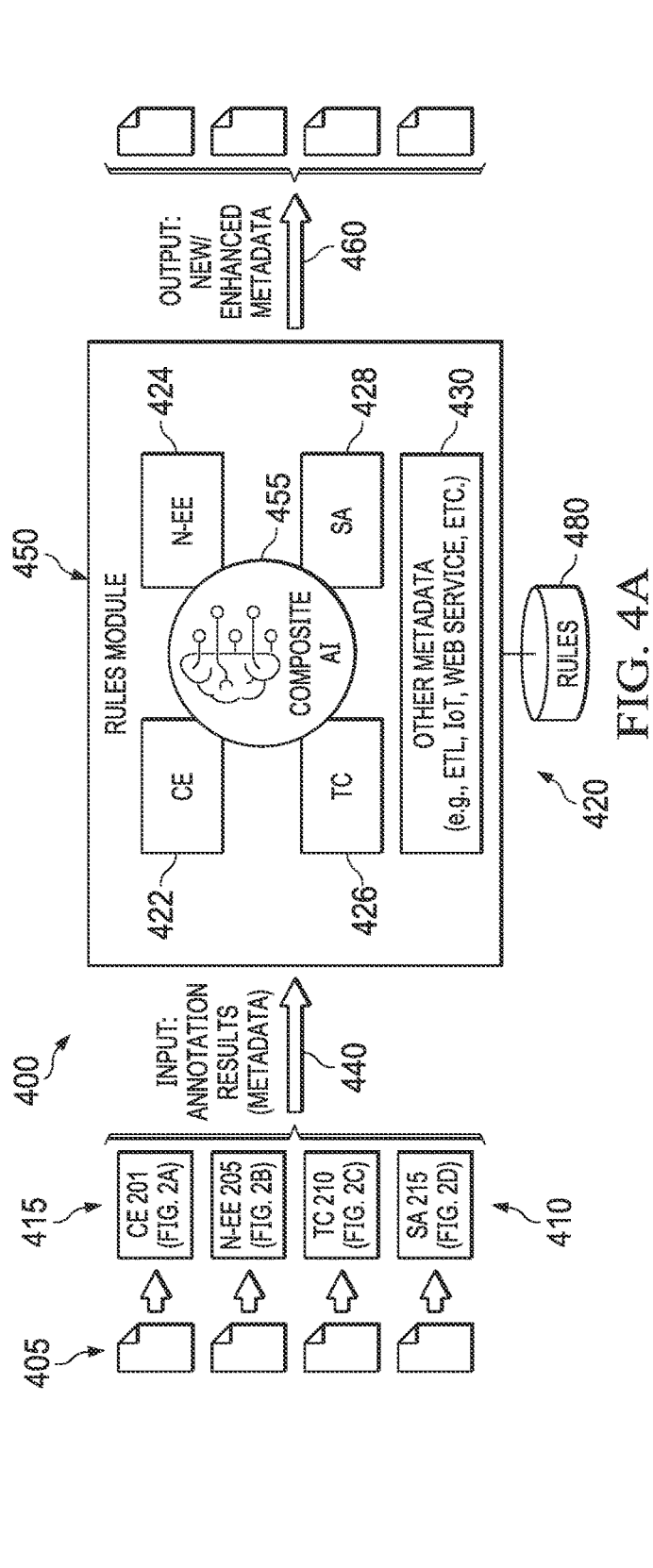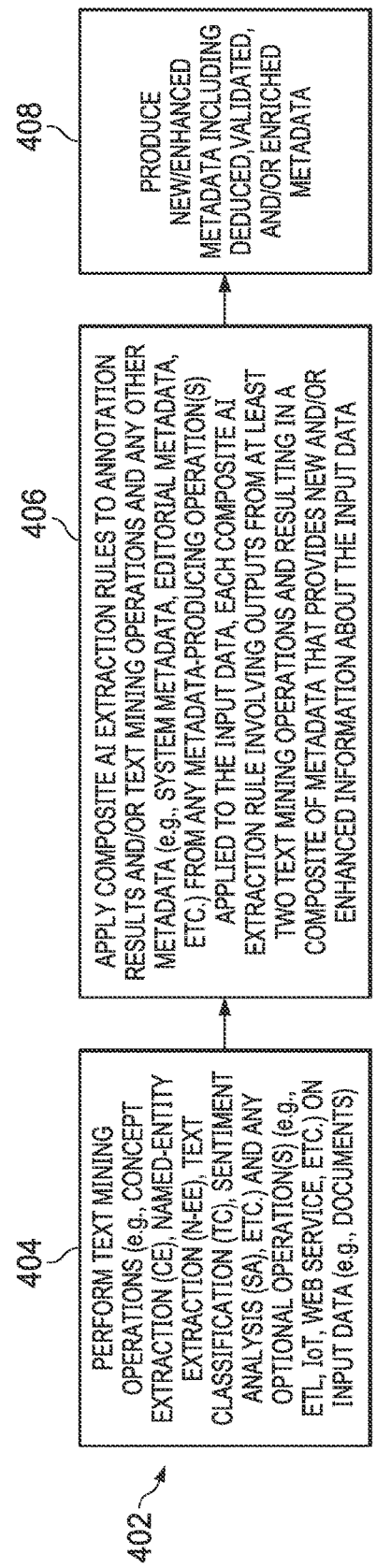

| Deduction | Validation | Enrichment |
|---|---|---|
| 530 → (Metadata + Metadata + Metadata) = Deduced Information (reasoning) — 532 | 550 → Metadata + Context = Validated, Accurate Metadata — 552 | 560 → Metadata + Metadata Attributes = Enriched Metadata — 562 |
| 538 → PN <John> talking in a <negative> way about financial product <Credit Card> for his company <ON> = <Unlikely to Renew> (= new information deduced from several extraction results)<br>534 →<br>536 →<br>542 → — 540 | 554 → SSN found in a context of Person Name and <social number> trigger. — 558<br>556 → | 564 → Acquisition date found in the proximity of two organization names and the trigger <acquired> found. Attributes added: — 568<br>• Organization one = <acquirer><br>• Organization two = <acquired><br>• Date of Acquisition = <dateofacq><br>566 → }— 570 |

Rules Builder
Build  Test

Rules Information
ID : 3038e548-c23b-4cdb-9538-30157d063778
○ pre  ● post

* Name
SSN_US

* Language
[eng ×]        ∨

Description
Social Security Number / SSN

* Group
SSN                  ∨        Add New Group

Scope
sentence  ∨

* Count
1

* Order
2

Cancel    Save

Rules Sequence ⊙
Code  Visual
                                                    Create Sequence with Input The Battle of Carbisdale (also known as Invercarron) took place close to the village of Culrain, Sutherland, Scotland on 27 April 1650 and was part of the wars of the Three Kingdoms. It was fought by the Royalist leader J. Graham, 1st Marquess of Montrose, (born on October 25, 1612) against the Scottish Government of the time, dominated by Archibald Campbell, 1st Marquess of Argyll (born March 1607) on and a grouping of radical Convenanters, known as the Kirk Party. The Covenanters decisively defeated the Royalists. The battlefield has been inventoried and protected by Historic Scotland under the Scottish Historical Environment Policy of 2009. Although Carbisdale is the name of the nearest farm to the site of the battle, Culrain is the nearest village.

* Script ⊙  710
Code

```
for m in doc.getMatches () :
    nn = m.customEntity (0)
    val = nn.extractMatchingPatterns (('(?1666|000|9)\d{2})\d{3} [= [(?!00)\d{2}]= [(?!0)\d{4}])\d{4}' , 7000,7000)
    doc.addEntity(' SSN_US ', val)
```

Rules List

| Name | Type | Group | Features | Actions |
|---|---|---|---|---|
| SSN_DE<br>for m in doc.getMatches( ):<br>nn = m.customEntity(0) . . . | post | SSN | Entity | Actions ▾<br>Edit / Clone / Delete |
| SSN_UK<br>for m in doc.getMatches( ):<br>nn = m.customEntity(0) . . . | post | SSN | Entity | Actions ▾ |
| SSN_FR<br>for m in doc.getMatches( ):<br>nn = m.customEntity(0) . . . | post | SSN | Entity | Actions ▾ |
| SSN_US<br>for m in doc.getMatches( ):<br>nn = m.customEntity(0) . . . | post | SSN | Entity | Actions ▾ |
| SSN_CA<br>for m in doc.getMatches( ):<br>nn = m.customEntity(0) . . . | post | SSN | Entity | Actions ▾ |
| Employee_Number_Italy<br>for m in doc.getMatches( ):<br>nn = m.customEntity(0) . . . | post | NEW | Entity | Actions ▾ |
| Test<br>for m in doc.getMatches( ):<br>nn = m.customEntity(0) . . . | post | NEW | Entity | Actions ▾ |

FIG. 8

COMPOSITE EXTRACTION SYSTEMS AND METHODS FOR ARTIFICIAL INTELLIGENCE PLATFORM

FIELD OF THE INVENTION

This invention relates generally to artificial intelligence. More particularly, this invention relates to composite extraction systems, methods, and computer program products with natural language understanding for an artificial intelligence platform.

SUMMARY OF THE DISCLOSURE

Artificial intelligence (AI) generally refers to the intelligence demonstrated by machines, in contrast to the natural intelligence displayed by humans or animals. Within the field of AI, natural language processing (NLP) refers to the ability of machines to read and understand human language. In practice, an AI platform may have NLP capabilities such as concept extraction, named entity extraction, and text classification. For instance, a concept extraction module may be configured for extracting and ranking tokens, nominal and/or verbal keywords and key phrases; a named entity extraction module may be configured for identifying, extracting, ranking, and unifying and normalizing named entities using AI models and dictionaries; and a text classification module may be configured for classifying and ranking the content of documents according to taxonomies automated in AI (i.e., machine learning) models.

Natural language understanding (NLU) or natural language interpretation (NLI) is a subtopic of NLP that concerns the reading comprehension of machines. In practice, an AI platform may have NLU capabilities such as sentiment analysis and summarization. Sentiment analysis concerns the detection of subjectivity, tonality, emotions, and intentions, and the ranking of sentences, entities, and documents. Summarization concerns the extraction of most relevant sentence according to topics of interest, rules, and keywords. Unfortunately, these NLU capabilities are very difficult to achieve in the real world. An issue here is the accuracy of results from these NLU processes. A related issue is that the accuracy of NLU processing results is affected by the quality of inputs (e.g., extracted named entities, extracted concepts, etc.) to the NLU processes.

For example, suppose concepts like "airport," "fly," and "London" could be extracted (e.g., by a concept or named entity extraction modules) from a document along with the word "aircraft." A machine with a machine learning model could recognize that the set of extracted concepts follow a pattern of known phrases in English. However, the pattern of known phrases is associated to other concepts and phrases with a wide range of possible relationships and multiple classifications in a taxonomy. While the machine could determine a probability for each of the possible concepts and classify the document as belonging to one of the taxonomy labels, the results are based on either individual probabilities or knowledge base gathered information (e.g., average generic values gathered in a knowledge base). Consequently, inputs to the NLU processes may already be skewed. The inaccuracies that may already be present in the inputs to the NLU processes can affect the ability of the machine to accurately comprehend the meaning of the document. As a result, the outcome is often less than satisfactory.

To this end, embodiments disclosed herein combine results from a composite of AI models to reach a conclusion with a higher degree of truth than what the individual results from these AI models could reach. Operationally, the invention involves a first layer of AI models including concept extraction (CE), named entity extraction (N-EE), text classification (TC), and sentiment analysis (SA). At a second layer, a rules module can apply composite AI extraction rules for composite AI extraction by combining various operations and/or metadata produced thereby. The rules module is adapted for capturing annotation contexts through controlled vocabularies, determining relationships as attribute values, pre-tagging texts of interest, and generating deducted, validated, and/or enriched metadata. Architecturally, the rules module can be considered as part of a text mining system that operates an ingestion pipeline that ingests input data from disparate sources and that produces a variety of metadata for indexing, big data analytics, and so on. Some embodiments provide a rules builder for building composite AI extraction rules through a user interface. In some embodiments, the rules builder includes a coding tool for defining rules scope and order using a high-level programming language.

In some embodiments, a method of composite AI extraction may comprise performing, at a first layer of processing, a first operation on input data, the first operating producing metadata about the input data and applying, at a second layer of processing, a composite AI extraction rule to the input data. In some embodiments, the composite AI extraction rule has a rule condition and a rule action. The rule condition includes the metadata produced by the first operation and the rule action includes a second operation. In some embodiments, the composite AI extraction rule may further include a rule trigger identifying named entities such as: a person name, an event, a date, a specific number, or whatever appropriate contextual information previously tagged in the input data.

In some embodiments, the first operation can comprise a NLP operation, a CE operation, a N-EE operation, a TC operation, a NLU operation, a SA operation, an extract, transform, load operation, an Internet-of-Things operation, or a web service. In some embodiments, the second operation can comprise at least one of another NLP operation, another CE operation, another N-EE operation, another TC operation, another NLU operation, or another SA operation.

In some embodiments, the metadata produced by the first operation can include text mining metadata, system metadata, or editorial metadata. Examples of the text mining metadata can include NLP metadata, a concept, a named entity, a keyword, a phrase, a classification, NLU metadata, a sentiment, a tonality, an emotion, or an intention. Examples of system metadata are size, file location, file permissions, etc. Examples of editorial metadata are author name, file name, modification date, etc.

In some embodiments, application of the composite AI extraction rule comprises performing the rule action responsive to the rule condition being met, resulting in a composite of the metadata and new/enhanced information about the input data. The new/enhanced information can include deduced metadata, validated metadata, enriched metadata, or a combination thereof. In some embodiments, the deduced metadata can include information deduced from multiple pieces of metadata from the first operation, the validated metadata can include a named entity or any keyword or key phrase that contextually validates the metadata from the first operation, and the enriched metadata can include attributes describing the metadata from the first operation. The deduced metadata, the validated metadata, the enriched metadata, or a combination thereof thus produced can be provided to a facility downstream from the second layer of processing for various purposes, including, but are not limited to, indexing, storage, big data analytics, reporting, and so on.

In some embodiments, a method for semantic metadata extraction using a composite module extraction engine can comprise: receiving content on a server, the server executing the composite module extraction; defining a plurality of modules for extracting of semantic metadata from the content; and executing a composite of the modules, by the composite module extraction engine, the composite of modules comprising at least two modules of the plurality of modules. In some embodiments, execution of the composite of the modules can include importing a set of rules for semantic metadata extraction; defining an order of operation of the composite of modules; and generating a set of semantic metadata by executing on the content the composite rules in the defined order of operation, wherein the first module in the order of operation provides a result to the second module in the order of operation. The set of semantic metadata, which can include deducted metadata, validated metadata, and/or enriched metadata, can then be outputted, stored, or otherwise used for various purposes.

In some embodiments, the plurality of modules can include a plurality of natural language processing modules and a plurality of natural language understanding modules. The plurality of natural language processing modules can include a concept extraction module, a named entity module, and a text classification module, and the plurality of natural language understanding modules comprises a sentiment analysis module and a summarization module. In some embodiments, the plurality of modules can include an extract, transform, and load module, an artificial intelligence service module, a text similarity module, a language detection module, and a speech-to-text module.

In some embodiments, the method may further comprise executing a rules builder on the server, the rules builder defining the set of rules. In some embodiments, the set of rules can be built by defining whether a rule is processed before content processing modules or after the processing modules, defining the order of the rules, and defining whether to apply visual analytical information to unstructured text in the content.

One embodiment comprises a system comprising a processor and a non-transitory computer-readable storage medium that stores computer instructions translatable by the processor to perform a method substantially as described herein. Another embodiment comprises a computer program product having a non-transitory computer-readable storage medium that stores computer instructions translatable by a processor to perform a method substantially as described herein. Numerous other embodiments are also possible.

These, and other, aspects of the disclosure will be better appreciated and understood when considered in conjunction with the following description and the accompanying drawings. It should be understood, however, that the following description, while indicating various embodiments of the disclosure and numerous specific details thereof, is given by way of illustration and not of limitation. Many substitutions, modifications, additions and/or rearrangements may be made within the scope of the disclosure without departing from the spirit thereof, and the disclosure includes all such substitutions, modifications, additions and/or rearrangements.

BRIEF DESCRIPTION OF THE DRAWINGS

The drawings accompanying and forming part of this specification are included to depict certain aspects of the invention. A clearer impression of the invention, and of the components and operation of systems provided with the invention, will become more readily apparent by referring to the exemplary, and therefore non-limiting, embodiments illustrated in the drawings, wherein identical reference numerals designate the same components. The features illustrated in the drawings are not necessarily drawn to scale.

FIGS. 2A-2D each depicts a diagrammatic representation of a text mining process shown in FIG. 1.

FIG. 4A depicts a diagrammatic representation of composite AI extraction with a first layer where documents are processed by the text mining modules of FIG. 1 to generate annotation results and a second layer where the annotation results are processed by a rules module with composite AI extraction rules for composite extraction according to some embodiments disclosed herein.

FIG. 4B is a flow diagram that illustrates the composite AI extraction operation of FIG. 4A according to some embodiments disclosed herein.

FIG. 5B shows examples of new/enhanced metadata generated through the composite AI extraction operation of FIG. 5A according to some embodiments disclosed herein.

FIG. 7 depicts an example user interface of a rules builder for building composite AI extraction rules according to some embodiments disclosed herein.

FIG. 8 shows an example of a list of composite AI extraction rules that can be built using the rules builder shown in FIG. 7 and utilized by a rules module or engine according to some embodiments disclosed herein.

DETAILED DESCRIPTION

The invention and the various features and advantageous details thereof are explained more fully with reference to the non-limiting embodiments that are illustrated in the accompanying drawings and detailed in the following description. Descriptions of well-known starting materials, processing techniques, components and equipment are omitted so as not to unnecessarily obscure the invention in detail. It should be understood, however, that the detailed description and the specific examples, while indicating some embodiments of the invention, are given by way of illustration only and not by way of limitation. Various substitutions, modifications, additions and/or rearrangements within the spirit and/or scope of the underlying inventive concept will become apparent to those skilled in the art from this disclosure.

Figure 1:
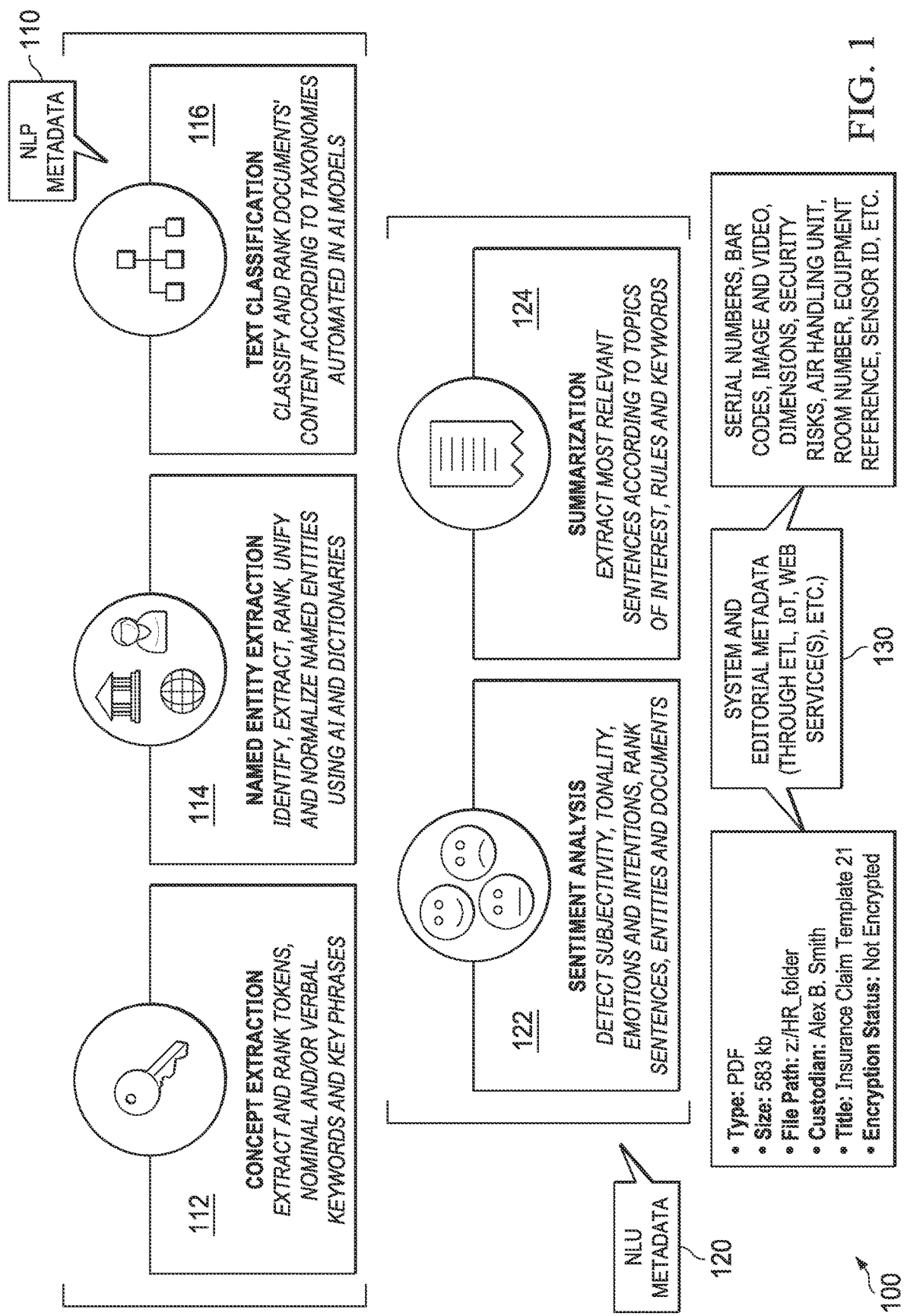
FIG. 1 shows text mining modules configured for performing natural language processing and natural language understanding tasks.

FIG. 1 shows text mining modules running on an AI platform, the text mining modules configured for obtaining and/or generating various types of metadata describing input data. For the purpose of illustration, textual content of a document is used as a non-limiting example of input data. Those skilled in the art can appreciate that textual content can come into an AI platform in various ways. For example, the AI platform may provide named entity extraction and semantic metadata extraction as core services to a document processing system operating in an enterprise computing network. Although not shown in FIG. 1, the AI platform may provide other AI services such as similarity, language detection, image analysis, summarization, speech-to-text (STT), etc. Some of the AI services may be purpose-specific. For instance, the STT service is for converting audio or video files to text transcripts.

In processing documents of various types (e.g., word processing files, image files, invoices, articles, web pages, social networking posts, etc.), the document processing system may utilize the metadata extraction service provided by the AI platform to learn more about the content of each document or a portion thereof, leveraging the intelligence and advanced processing capabilities of the AI platform. Embodiments disclosed herein can enhance the metadata extraction functionality of an AI platform with a composite AI extraction capability that can produce new information and/or more accurate details on input data.

In some embodiments, AI platform 100 is capable of producing metadata of various types, including NLP metadata 110, NLU metadata 120, and system and editorial metadata 130. System and editorial metadata 130 can be generated by disparate sources such as Extract, Transform, Load (ETL) tools, Internet of Things (IoT), web services, etc. Many other types of metadata can be generated and provided to AI platform 100, including serial numbers, bar codes, image and video formats, dimensions, security risks, air handling unit, room number, equipment reference, sensor identifier, etc. Sources of system and editorial metadata 130 are known to those skilled in the art and thus are not further described herein.

NLP metadata 110 and NLU metadata 120 are generated by text mining modules 112-124 of AI platform 100. As a non-limiting example, text mining modules 112-124 can be generally categorized as those that perform natural language processing (NLP) and those that perform natural language understanding (NLU). In the example of FIG. 1, NLP processes are performed by concept extraction (CE) module 112, named entity extraction (N-EE) module 114, and text classification (TC) module 116, and NLU processes are performed by sentiment analysis (SA) module 122 and summarization module (124).

Figure 2A:
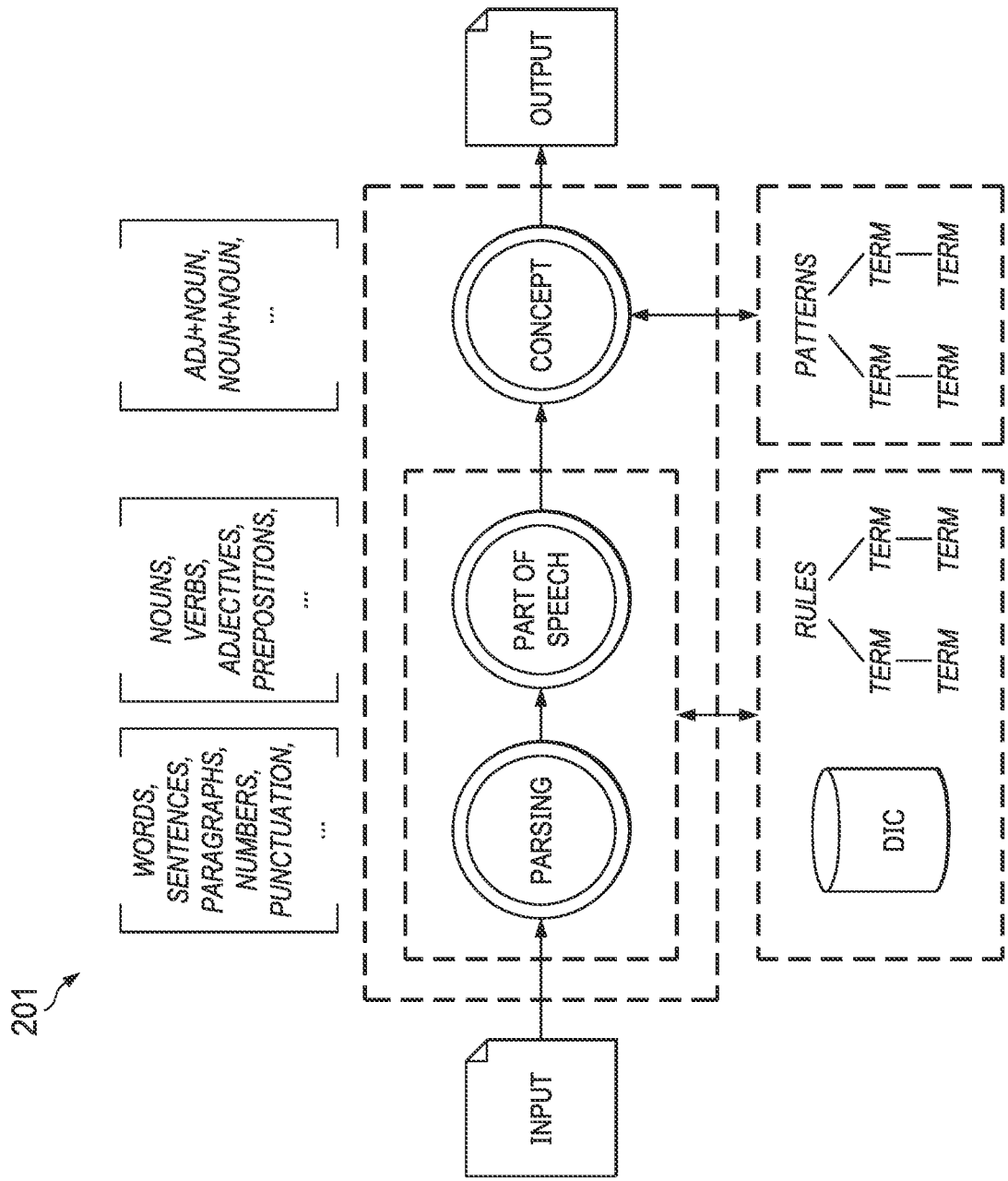

FIG. 2A depicts a diagrammatic representation of a CE process 201. In some embodiments, CE module 112 can be adapted for extracting and ranking tokens, nominal and/or verbal keywords and key phrases from an input document and determining, through speech recognition and pattern matching, a concept found (or a probability that such a concept is present) in the input document.

Figure 2B:
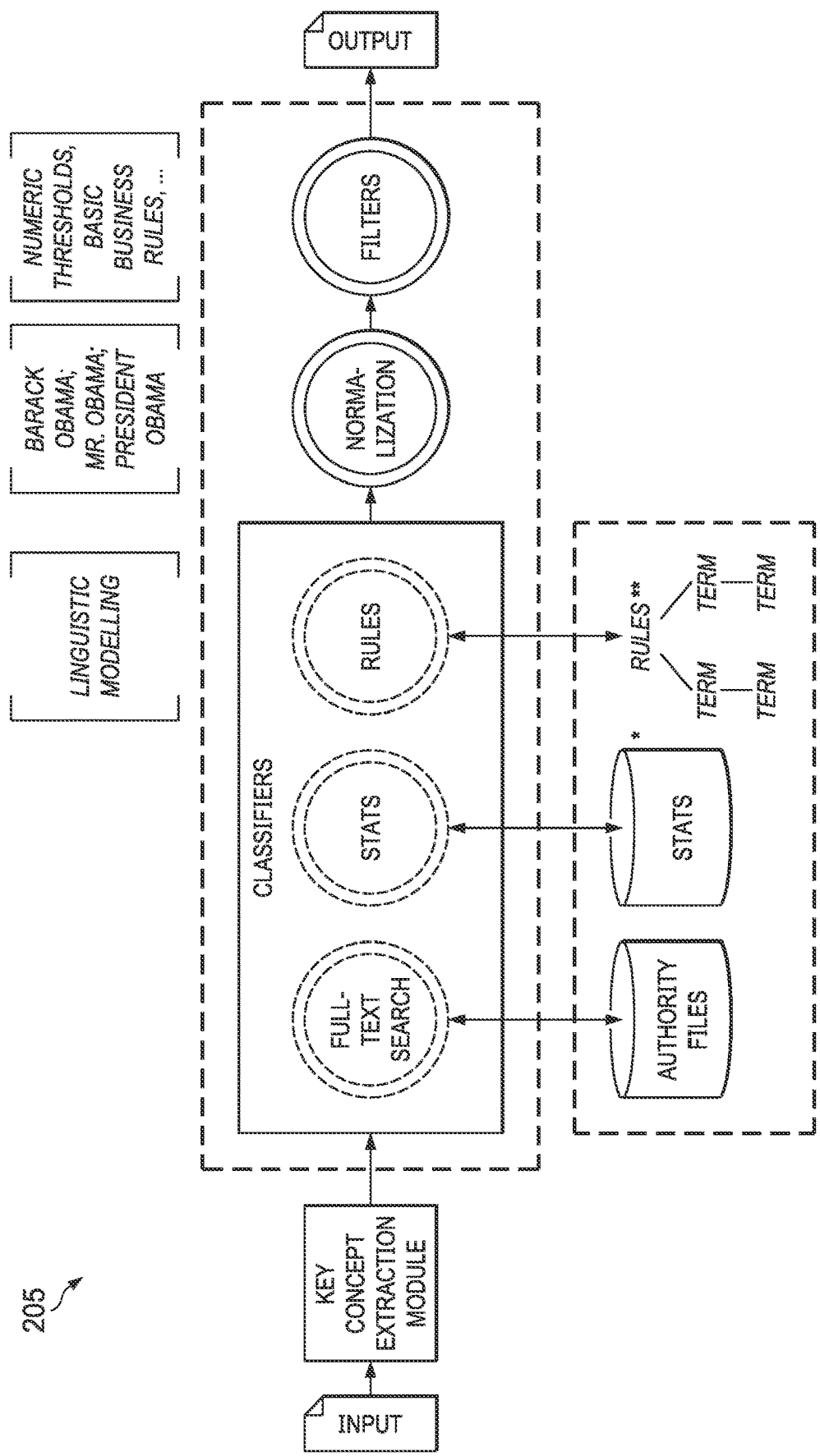

FIG. 2B depicts a diagrammatic representation of a N-EE process 205. In some embodiments, N-EE module 114 can be adapted for identifying, extracting, ranking, unifying, and normalizing named entities using machine learning models and dictionaries.

FIG. 2C depicts a diagrammatic representation of a TC process 210. In some embodiments, TC module 116 can be adapted for classifying and ranking the content of documents according to taxonomies automated in trained machine learning models.

Figure 2D:
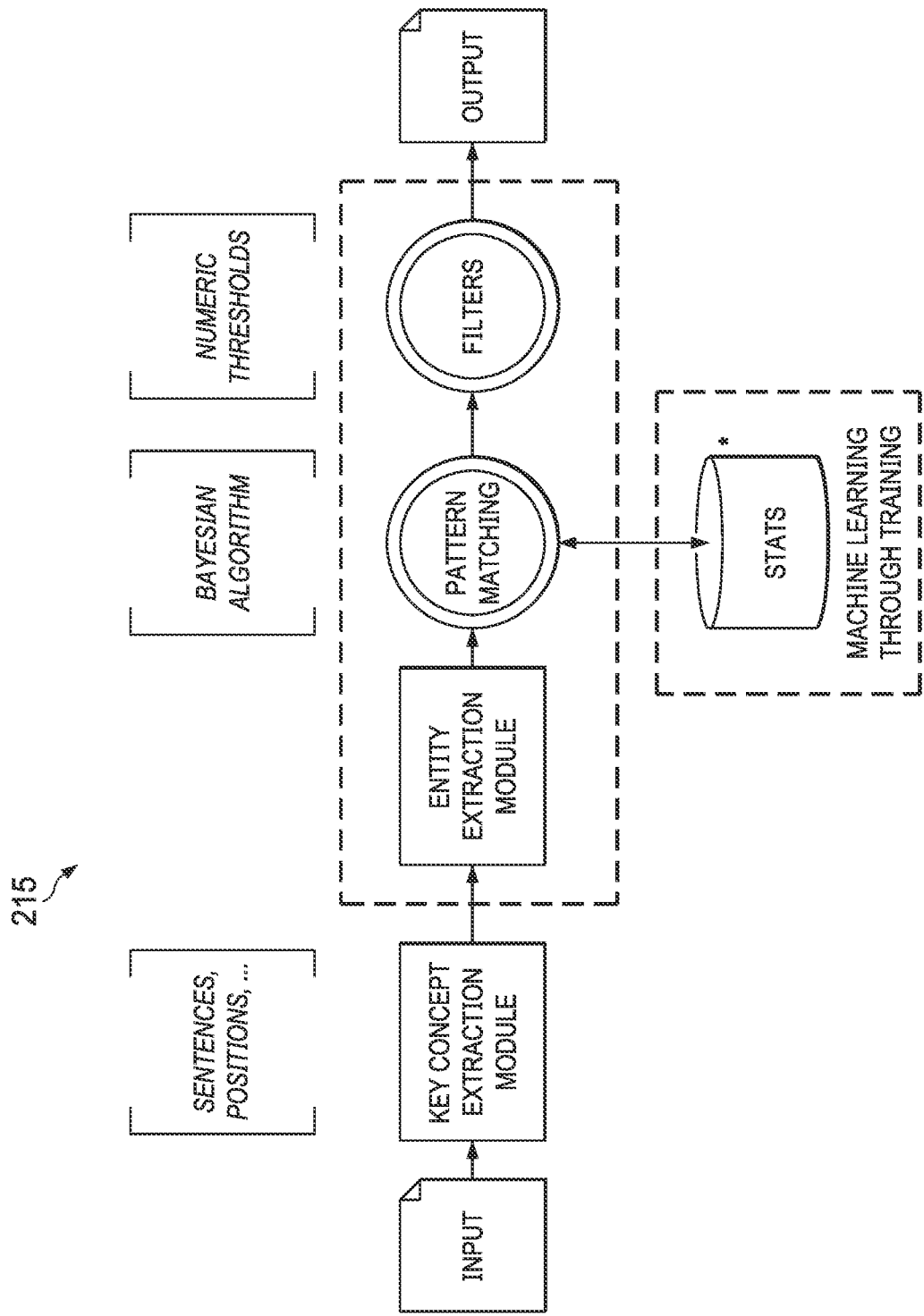

FIG. 2D depicts a diagrammatic representation of a SA process 215. In some embodiments, SA module 118 can be adapted for detecting subjectivity, tonality, emotions, and intentions and for ranking sentences, entities, and documents.

In some cases, an input text string can be processed by one or more of the text mining modules of the AI platform. In some cases, the textual content of a document or a plurality of documents of various types can be processed through an ingestion pipeline formed by chaining these text mining modules in series such that output from a text mining module is input to another. In these cases, the text mining modules produce discrete, individual results.

Figure 3:
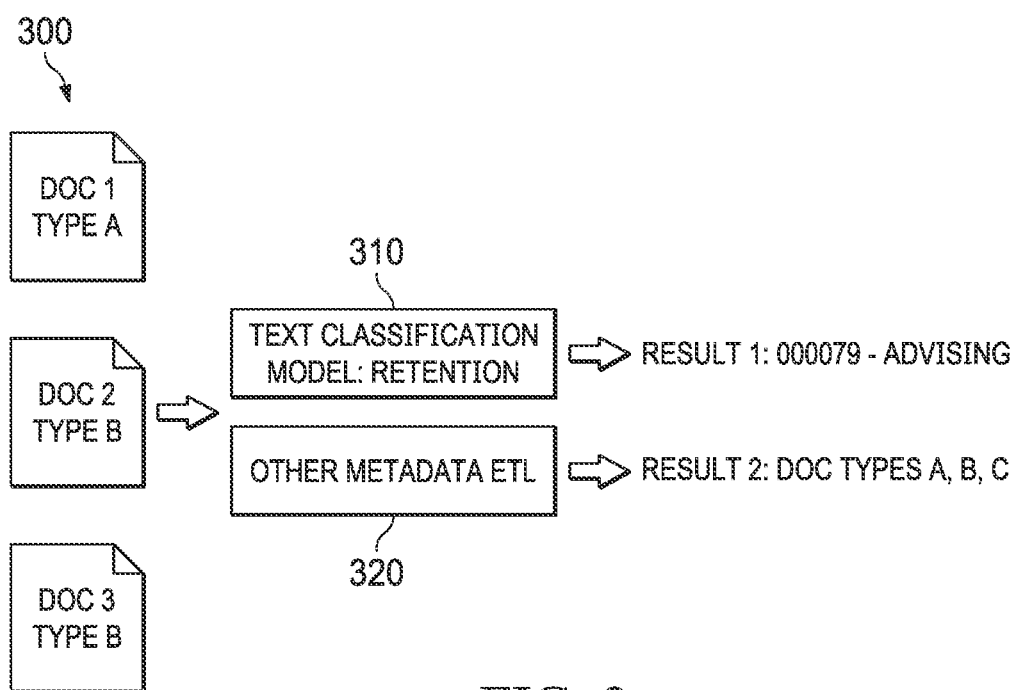
FIG. 3 shows individual text mining results from processing documents of various types.

For example, FIG. 3 shows that documents 300 of various types are processed through an NLP process 310 and an ETL process 320. NLP process 310 classifies documents 1, 2, and 3 into a category "000079" associated with a retention model for advising. Further, ETL process 320 identifies documents 1, 2, and 3 as having document types A, B, and C, respectively. These individual results were determined by NLP process 310 and ETL process 320 separately and independently of one another. Thus, it is not possible to classify only documents of a particular type into the category "000079" for advising.

To this end, embodiments disclosed herein provide a solution in which a rules module or engine can compose a meaningful result from these individual results more comprehensive than a sum of these individual results. An example of the rules module is shown in FIG. 4A. An example a layered operation of the rules module is illustrated in FIG. 4B. In some embodiments, the rules module can be considered as part of a text mining system having a text mining engine that operates an ingestion pipeline comprised of processing elements chained or connected in series. The text mining engine is operable to call these processing elements to ingest input data from disparate sources and produce a variety of metadata for indexing, big data analytics, and so on. In an embodiment, the rules module can be one of the processing elements in the ingestion pipeline.

FIG. 4A depicts a diagrammatic representation of an AI platform 400 having layered processing for composite AI extraction. In the example of FIG. 4A, input data 405 is processed through a first layer of processing 410 by text mining modules 415. In some embodiments, text mining modules 415 can perform CE process 201 shown in FIG. 2A, N-EE process 205 shown in FIG. 2B, TC process 210 shown in FIG. 2C, and SA process 215 shown in FIG. 2D. Each text mining module 415 can include a corresponding AI model for CE, N-EE, TC, or SA processing as discussed above.

In some embodiments, annotation results 440 generated from the first layer of processing 410 are provided as input to a second layer of processing layer 420. As a non-limiting example, annotation results 440 can include extracted concepts, extracted keywords/key phrases, named entities, text classification, and sentiments such as tonality, emotions (e.g., positive, negative, neutral), and intentions.

At the second layer of processing layer 420, a rules module 450 is operable to combine annotation results 440 from a composite of AI models to reach a conclusion with a higher degree of truth than what the individual results from these AI models could reach. In some embodiments, rules module 450 includes a composite AI decision logic 455 for applying composite AI extraction rules 480 to CE metadata 422 (e.g., extracted concepts, extracted keywords/key phrases, etc.), N-EE metadata 424 (e.g., named entities), TC metadata 426 (e.g., text classifications), SA metadata 428 (e.g., sentiments, tonality, emotions, intentions, etc.) and various other metadata 430. In some embodiments, composite AI decision logic 455 of rules module 450 is operable to utilize composite AI extraction rules to capture annotation contexts, determine relationships and expose them as attribute values, and pre-tag texts of interest. In this way, rules module 450 can generate new and/or enhanced metadata 460, including deduced, validated, and/or enriched metadata.

An example of this layered operation is provided in FIG. 4B. In some embodiments, composite AI extraction operation 402 includes performing, at the first layer of processing 404 (e.g., by text mining modules 415 shown in FIG. 4A), a plurality of text mining operations (e.g., CE process 201, N-EE process 205, TC process 210, and SA process 215 shown in FIGS. 2A-2D and FIG. 4A) on input data (e.g., a string or block of text, a document, documents of various types, etc.). Optionally, any metadata-producing operations, such as ETL, IoT, web service, etc., may also be performed. In some embodiments, such metadata-producing operations can be performed in conjunction with the plurality of text mining operations. In some embodiments, such metadata-producing operations can be performed separately and independently of the plurality of text mining operations. In some embodiments, no other metadata-producing operations are performed on the AI platform. Rather, other metadata, such as IoT metadata, etc. are provided by and/or obtained from source(s) external to the AI platform. The AI platform can provide system metadata and editorial metadata internally.

In some embodiments, outputs (e.g., annotation results from the text mining operations and any other metadata, such as system metadata, editorial metadata, etc., from any metadata-producing operations such as ETL, IoT, web services, etc.) from the first layer of processing 404 are provided as input to the second layer of processing 406. In some embodiments, additional metadata from external source(s) may also be provided to the second layer of processing 406.

In some embodiments, at the second layer of processing 406, composite AI extraction rules (e.g., composite AI extraction rules 480) are applied to the annotation results from the text mining operations and any applicable metadata from various sources (e.g., ETL, IoT, web services, etc.). In some embodiments, a composite AI extraction rule may require performing a text mining operation with the output from another operation. For example, a composite AI extraction rule may specify running a NLP process using outputs from a NLU process. As another example, a composite AI extraction rule may specify performing a TC operation using outputs from an ETL operation. In some embodiments, a composite AI extraction rule may involve outputs from at least two text mining operations. In embodiments disclosed herein, applicable of composite AI extraction rules can produce new and/or enhanced information 408 about the input data.

In some embodiments, new and/or enhanced information 408 can include deduced, validated, and/or enriched metadata. Examples of composite AI extraction rules and deduced, validated, and/or enriched metadata thus produced are provided below. Further, as discussed below, AI platform 400 provides a rules builder for building composite AI extraction rules through a user interface. In some embodiments, the rules builder includes a programming tool for defining rules scope and order using a high-level programming language.

Figure 5A:
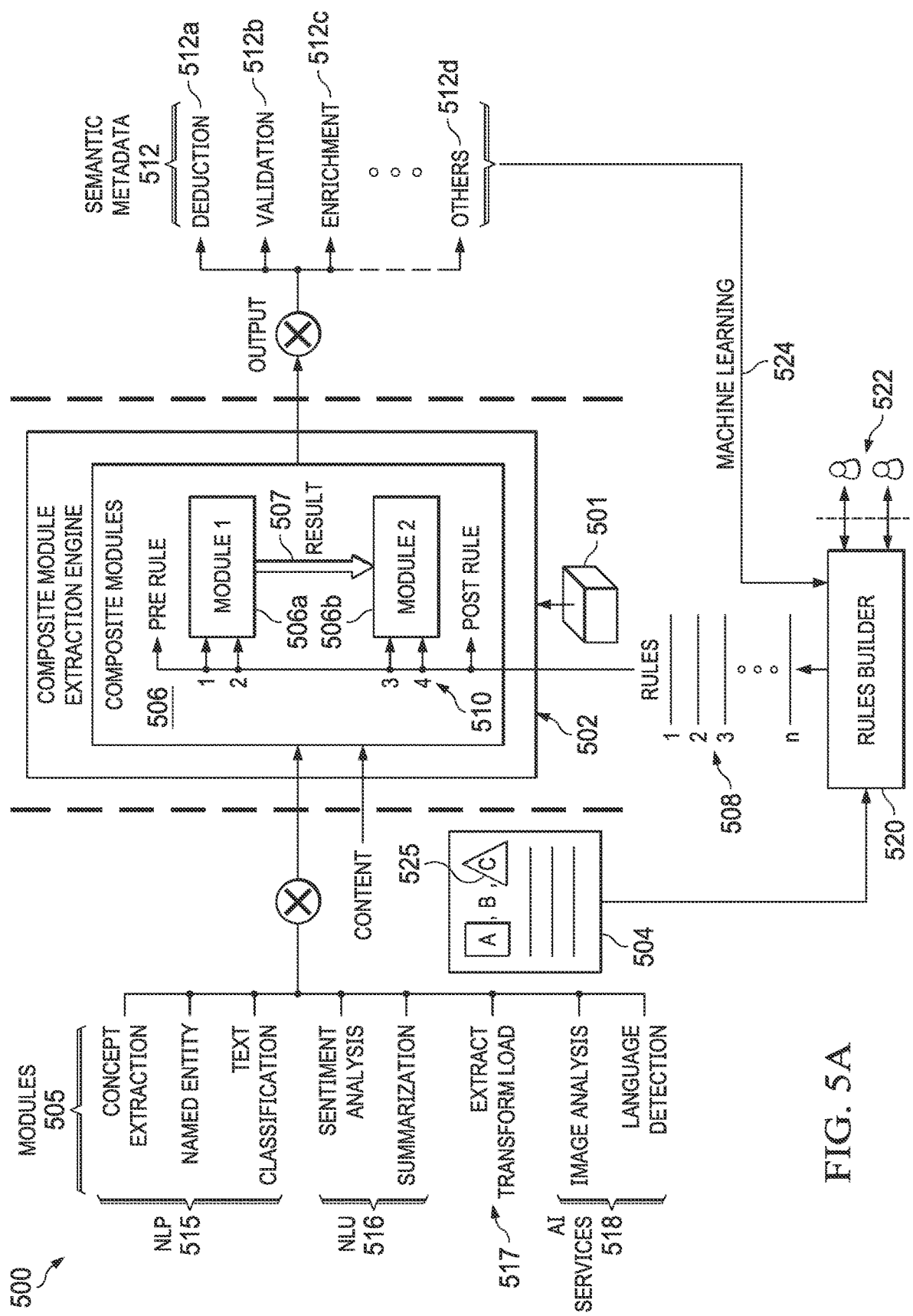
FIG. 5A depicts a diagrammatic representation of another example of composite AI extraction according to some embodiments disclosed herein.

FIG. 5A depicts a diagrammatic representation of another example of composite AI extraction according to some embodiments disclosed herein. In the example of FIG. 5A, a new, novel, useful, and non-obvious inventive technique 500 is directed to semantic metadata extraction using a composite AI extraction engine 502 (hereinafter referred to as "the engine"). The engine 502 executes on a server 501, receives content 504 and exploits a plurality of modules 505 for processing semantic metadata from the content 504. The engine 502 executes a composite of the modules 506, meaning that it executes at least two modules of the plurality of modules 505 and up to n modules. A set of rules 508 for semantic metadata extraction is imported for acting on the modules 506 and an order of operation 510 of the composite modules 506 is further defined.

In some embodiments, the engine 502 executes the composite of modules 506 in the defined order of operation 510 and according to the set of rules 508 to generate a set of semantic metadata 512. Furthermore, the first composite module 506a in the order of operation 510 provides a result 507 to the second composite module 506b in the order of operation 510. The engine 502 outputs the set of semantic metadata 512. In this way, a synergistic effect results, one in which the sum of executing the composite modules 506 in tandem is greater than executing each module individually. This represents an advantageous advance and leap over the prior art in which each module is executed to produce a separate result of distinct semantic metadata extractions unrelatable and incapable of combining the insights of each result.

In further embodiments, the plurality of modules 505 comprises a plurality of NLP modules 515 and a plurality of NLU modules 516. Still further, the plurality of NLP modules 515 comprises a CE module, a N-EE module, and TC module, and the plurality of NLU modules 516 comprises a SA module and a summarization module. In still further embodiments, the plurality of modules 505 further includes an ETL module 517, an AI service module 518, a text similarity module, a language detection module, and a speech-to-text module. In some embodiments, the AI service module 518 may include an image analysis module and a language detection module. It should be noted the foregoing modules 505 are intended to operate primarily on unstructured text and/or text preprocessed into structural elements as content 504 to be received by the engine 502. It is possible to use data decommissioning techniques and perform the same on structured data. In this way, the modules 505 are primarily employed for text mining type purposes. However, the inventive technique 500 is not limited to text-based semantic metadata extraction and can be employed for image processing and other types of domain level processing.

In some embodiments, a rules builder 520 can be utilized to define the set of rules 508, including whether a rule is processed before the modules or after the modules, the order of the rules, and whether to apply visual analytical information (generally represented by reference numeral 525) to unstructured text in the content 504. In some embodiments, the rules builder 520 executes on the server 501 or it may run as a client on a user device. In the example of FIG. 5B, analytical information may include category labels 525 representing classifications for content 504, such as a rounded square icon for content category "A" and a triangle icon for content category "C". These categories could be regrouped in a taxonomy. Rules may be derived by rule designer human users 522, however, machine learning techniques 524 may also be employed to derive rules using exemplars and/or feedback mechanisms in which a rule is generated by a machine learning process, tested on composite modules, and the value of the result ascertained to determine whether a candidate rule is effective.

The set of rules 508 may include specific instructions for acting on the content and/or metadata, including, but not limited to, trigger rules which look for specific metadata and when found, trigger an action or a semantic relationship, proximity rules which look for metadata within a certain distance of other metadata and generates relationships between proximate data points, from which metadata can be extracted, and attribution rules which define and populate metadata. In other embodiments, rules may be scripts written in a particular computer language such as Python. Other interpreted languages such as PHP, Perl, JavaScript, Ruby, and/or precompiled languages such as C, C++, and hybrids such as Java are also possible.

According to embodiments, application of composite AI extraction rules on a set of metadata can produce semantic metadata 512 including deduced metadata 512a, validated metadata 512b, enriched metadata 512c, and/or other types of metadata 512d. Deduced metadata 512a refers to a type of metadata that pertains to meaning deduced from extracted pieces of metadata. Validated metadata 512b refers to a type of metadata validated through the context of where a piece of metadata is found. The context plus the piece of metadata is more accurate than the piece of metadata alone. In some embodiments, there can be three options in regard to context: it could be defined as consecutive word, sentence or as document. Enriched metadata 512c refers to a type of metadata that can be enriched with additional metadata attributes further describing a piece of extracted metadata.

As shown in FIG. 5B, application of a composite AI rule to multiple pieces of metadata 530 can generate new/enhanced information, including deduced information 532, representing reasoning derived from the multiple pieces of metadata 530. For example, a composite AI rule can be defined to deduce new information from certain annotated results from N-EE and SA, such as a combination of <Person Name> 534 (here, < > denotes a metadata field and the text inside denotes the name of the metadata field), <Sentiment> 538, <Financial Product> 536, and <Company> 540. For instance, a composite AI rule may specify that, if the metadata value for <Sentiment> 538 is negative, then the person named in <Person Name> 534 is unlikely to use the financial product mentioned in <Financial Product> 536 for the particular company listed in <Company> 540. Accordingly, application of this composite AI rule would produce a new metadata field to classify document content as <Unlikely to Renew> 532 associated with the combination of extraction results.

In this case, a person named <John> 534 (here, a metadata value is placed inside < > instead of the name of a corresponding metadata field) is talking in a <negative> way 538 about a financial product <Credit Card> 536 for his company <Organization Name>540. From these pieces of metadata 534, 536, 540, combined with the negative sentiment 538, the engine 502 can deduce that John is unlikely to renew the credit card found in <Financial Product> 536 for the company found in <Company> 540. The new information 532 thus deduced is then associated with metadata 534, 536, 538, 540.

In another non-limiting example, application of a composite AI rule can generate validated, accurate metadata 552. For instance, a composite AI rule may specify that, if a sequence of number 554 is found in a context of <Person Name> 556 and <Social Security Number> trigger (e.g., a text string "social number," or "social security number"), then the sequence of number 554 represents a validated social security number for the person named in <Person Name> 556. In this case, suppose "000-111-2222" is found in a context of a person named "Karen" and a "social number" trigger. Then "000-111-2222" represents a validated social security number for Karen.

In a further example, a composite AI rule 560 can include a rule trigger which causes additional metadata attributes to be added to a piece of metadata (e.g., acquisition) to thereby generate enriched metadata 562. Composite AI rule 560 may specify that if an acquisition date 564 is found in the proximity 566 of two organization names and a rule trigger 568, then add metadata attributes 570. As an example, suppose an acquisition date, 04/04/19, is found in the proximity of two organization names, Organization one and Organization two, and a rule trigger <acquired>. Per composite AI rule 560, additional metadata attributes 570 are added, with metadata fields of <acquirer>, <acquired>, and <dateofacq> having metadata values of Organization one, Organization two, and 04/04/19, respectively.

Figure 6:
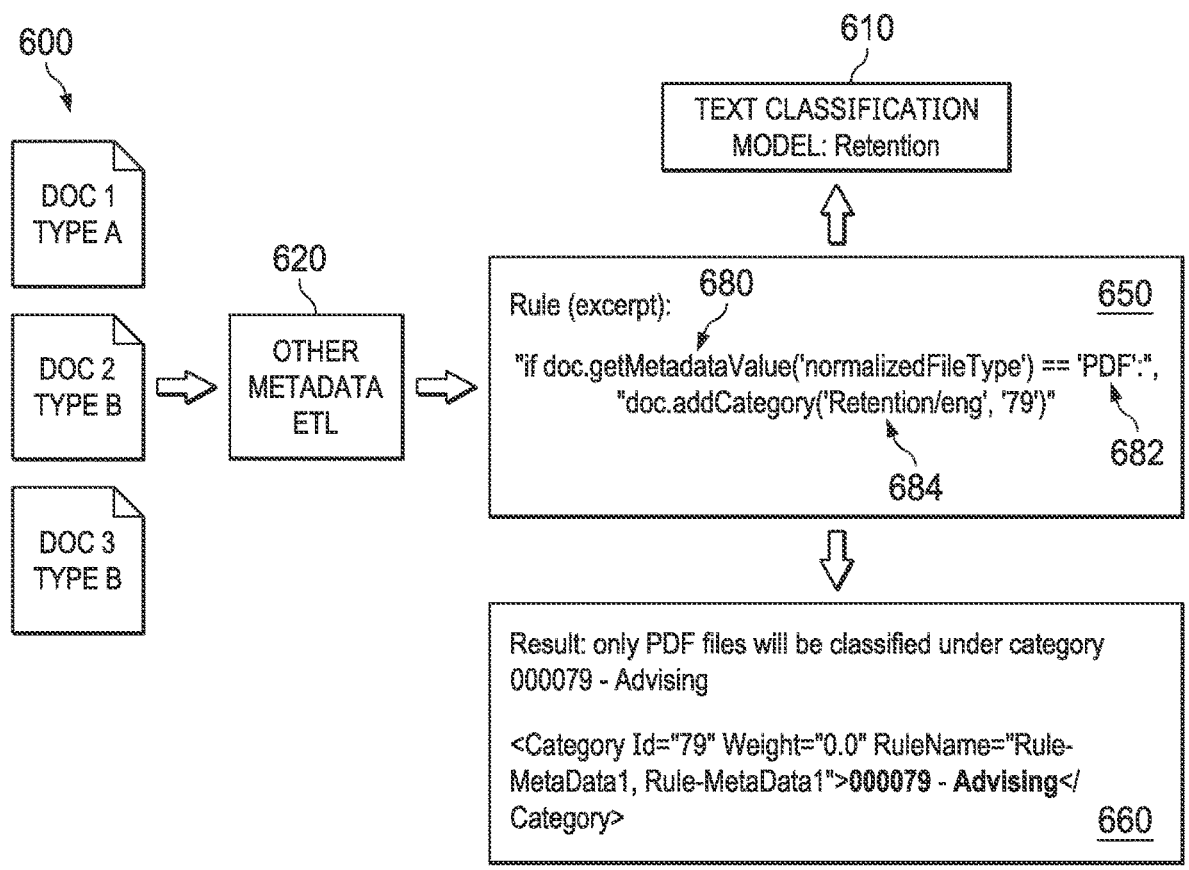
FIG. 6 shows an example of a composite AI rule and enhanced metadata thus produced from application of the composite AI rule according to some embodiments disclosed herein.

FIG. 6 shows an example of a composite AI extraction in which a composite AI extraction rule is applied to input documents of various types to produce enhanced metadata that otherwise would not exist. Returning briefly to FIG. 3, documents 1, 2, and 3 are all relevant to a retention model for advising. Consequently, documents 1, 2, and 3 are all classified by a TC process as under the category "000079" associated with the retention model for advising. Separately and independently, an ETL process (which could be performed before, after, or at the same time as the TC process) identifies documents 1, 2, and 3 as having document types A, B, and C, respectively. As discussed above, it is not possible to classify only documents of a particular type into the category code "000079" for advising.

In the example of FIG. 6, documents 600 of various types are processed through an ETL process 620 which identifies documents 1, 2, and 3 as having document types A, B, and C, respectively. Here, ETL process 620 can be characterized as the first layer of processing that produces metadata on document types of documents 600. At the second layer of processing, a rules module 650 is operable to apply a composite AI extraction rule 680 to the input documents and the associated document types produced by the ETL process. Suppose document type A represents the portal document format (PDF). As illustrated in FIG. 6, the composite AI extraction rule 680 can specify that only documents of a certain type (representing a rule condition 682) will be classified under a particular category (representing a rule action 684). In this way, only documents having the PDF type are classified under the category code "000079" associated with the retention model for advising. That is, due to application of composite AI extraction rule 680, enriched metadata 660 describing the specific category is produced and associated with documents having the PDF type. Documents of other types (e.g., those of document types B and C) are not classified under the category code "000079," even though all of these documents are relevant to the retention model for advising.

As discussed above, NLP and NLU capabilities are very difficult to achieve in the real world and the performance of existing NLP and NLU processes is often less than satisfactory. To further illustrate the complexity of NLP and NLU processing, consider the following example input text:

"The Battle of Carbisdale (also known as Invercarron) took place close to the village of Cutrain, Sutherland, Scotland on 27 Apr. 1650 and was part of the Wars of the Three Kingdoms. It was fought by the Royalist leader J. Graham, 1st Marquess of Montrose, (born on Oct. 25, 1612) against the Scottish Government of the time, dominated by Archibald Campbell, 1st Marquess of Argyll (born March 1607) on and a grouping of radical Covenanters, known as the Kirk Party. The Covenanters decisively defeated the Royalists. The battlefield has been inventoried and protected by Historic Scotland under the Scottish Historical Environment Policy of 2009. Although Carbisdale is the name of the nearest farm to the site of the battle, Culrain is the nearest village."

The above input text can be processed by a CE module. Utilizing a plurality of NLP models, the CE module may produce concepts, keywords, and/or phrases such as "defeated the Royalists," "was fought," "born," "radical Covenanters," "battle," "village," and so on.

The above input text can also be processed by a N-EE module. Utilizing a plurality of NLP models, the N-EE module may produce a plurality of named entities such as EVENTS: "Battle of Carbisdale", "Wars of the Three Kingdoms", PERSON NAMES: "J. Graham", "Archibald Campbell", GEOGRAPHIC LOCATIONS: "Scotland," DATES: "Apr. 27, 1650," "Oct. 25, 1612," "2009", ORGANIZATIONS: "Kirk Party," etc.

However, with existing concept and entity extraction methods, there is not an easy way to relate dates to events and people. Through some kind of ad-hoc post-processing, the year "2009" might even end up being the date when the "Battle of Carbisdale" took place because of the proximity and ranking of the words "Carbisdale" and "battle" to the date "2009."

In some embodiments, composite AI extraction rules can be applied to the annotation results from the CE module and the N-EE module in the example above. In some embodiments, a rules module may utilize a relevance-controlled vocabulary model in which contextual utility tags are used as event triggers (e.g., took place, started, happened, etc.) and birth triggers (e.g., born on, gave birth, etc.) for processing the input text. To this end, composite AI extraction rules may specify:

"for x in doc.get_entity_list('PN'):", "doc.add_attribute (x,'DateofBirth',doc.get_entity('BirthTrigger', 0).value( )"

"for x in doc.get_entity_list('EV'):", "doc.add_attribute (x,'DateofEvenf,doc.get_entity('EventTrigger', 0).value( )"

Match Example: "match": "<EV>(.*?)<EventTrigger>(.*?)<DT>"

In this example, application of such composite AI extraction rules to the input text above produces new information that can be added to the extracted metadata as descriptive attributes:

Battle of Carbisdale→Attribute <DateofEvent>value=Apr. 27, 1650

J. Graham→Attribute <DateofBirth>value=Oct. 25, 1612

As a non-limiting example, the extracted named entity "Battle of Carbisdale" now has a new attribute <Dateof Event> with the value of "Apr. 27, 1650" which is far more accurate than the year "2009." This new attribute is added due to an event trigger "took place" that follows the named entity "Battle of Carbisdale" and that is followed by the date of "27 Apr. 1650" in the input text.

For the extracted named entity "J. Graham," a new attribute <Dateof Birth> with the value of "Oct. 25, 1612" is added due to the birth trigger "born on" found in close proximity to the named entity "J. Graham" in the input text.

New attributes such as these enrich the annotation results from standalone text mining operations and provide additional, more accurate details about the input documents. Other ways to combine standalone text mining operations and/or results produced thereby are also possible.

A non-limiting example of a composite AI extraction rule that uses a result from a SA operation (which represents a NLU process) to perform a TC operation (which represents an NLP process) is provided below:

```
[
  "name": "Classification",
  "description": "Used for classification based on document tone",
  "groupId": "Classification",
  "language": [
    "eng"
  ],
  "order": 1,
  "script": [
    "if doc.getTone( )=='neutral' :",
    "   doc.addCategory('IPTC/eng', '01001000 - archaeology')",
    "if doc.getTone( )=='positive' :",
    "   doc.addCategory('IPTC/eng', '01002000 - architecture')",
    "if doc.getTone( )=='negative' :",
    "   doc.addCategory('IPTC/eng', '01005000 - cinema')"
  ]
]
```

In this example, tonality metadata values from the SA process are utilized to classify documents into different categories belonging to human activity taxonomy. Specifically, based on NLU value for a document such as neutral, positive, or negative, a document can be classified under the category of archaeology, architecture, or cinema, respectively. This example illustrates how classification can be deduced from NLU process.

Composite AI extraction rules such as those exemplified above can be built using a rules builder. FIG. 7 depicts an example user interface of a rules builder 700 for building composite AI extraction rules according to some embodiments disclosed herein. In some embodiments, rules builder 700 includes a coding tool 710 for defining rules scope and order using a high-level programming language. There could be different types of rules, for instance, extraction rules, pre-processing rules, and post-processing rules. A pre-processing rule will apply before any other processes. A post-processing rule, key type for Composite Extraction, will apply after all extractions and classifications have taken place. A simple rule will only apply the logic captured in the rule (e.g.: presence of a keyword, REGEX matching) to extract the information from a file. A user can use rules builder 700 to specify a rule sequence that dictates how a rule will apply—for instance, if a first entity is present, then apply a context, then validate another context, etc. In some embodiments, a piece of pre-tagged text can be presented as an encoded set of features in a code view or as text with colorful tags in a visual view for easy visual analysis.

In the example of FIG. 7, rules builder 700 is used to build a composite AI extraction rule for processing social security numbers (SSNs) in the United States. An SSN extractor that follows the SSN pattern "XXX-XX-XXXX" can be used to process input documents and extract SSNs from the input documents. The composite AI extraction rule for processing SSNs in the U.S. can validate the SSNs extracted from the input documents when triggered by, for instance, a phone number. As a non-limiting example, suppose an SSN is found in a document, triggered by a phone number in the document. The SSN can be validated against results from other annotators, e.g., controlled vocabulary model, person's name model, SSN model, etc. If the SSN was also found near a person's name, the SSN can be validated against that person's name. In this way, composite AI extraction can ensure that the result thus produced is more accurate than a single entity extracted using a standalone entity extraction model. Notice that the composite AI extraction rule for processing SSNs in the U.S. cannot be used for processing other number patterns such as credit card numbers, employee numbers, or SSNs in other countries. To this end, a list of composite AI extraction rules can be built using rules builder 700 shown in FIG. 7. An example of a rules list is illustrated in FIG. 8.

Figure 9:
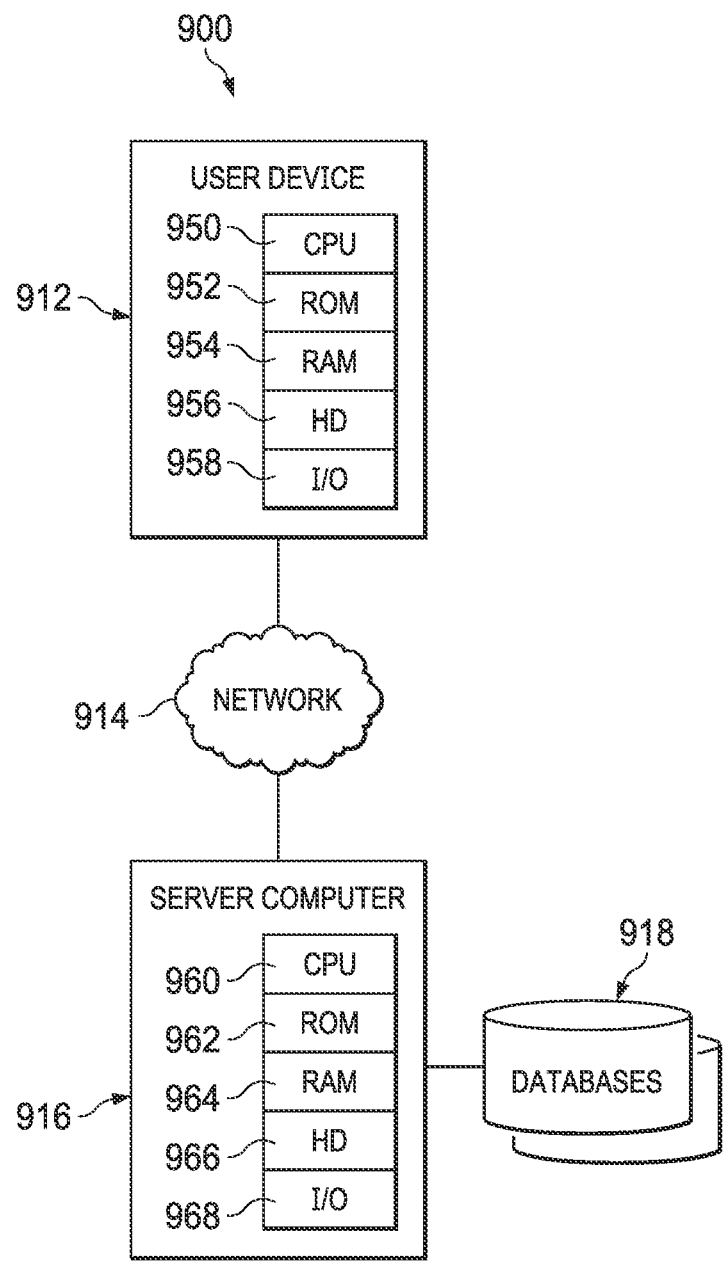
FIG. 9 depicts a diagrammatic representation of an example of a distributed network computing environment for implementing embodiments disclosed herein.

FIG. 9 depicts a diagrammatic representation of an example of a distributed network computing environment for implementing embodiments disclosed herein. In the example illustrated, network computing environment 900 includes network 914 that can be bi-directionally coupled to a user device 912 and a server computer 916 (e.g., one that operates on the premises of an enterprise or one that is hosted in a cloud computing environment). Computer 916 can be bi-directionally coupled to databases 918, for instance, one for NLP/NLU results and one for composite extraction rules. Network 914 may represent a combination of wired and wireless networks that network computing environment 900 may utilize for various types of network communications known to those skilled in the art.

For the purpose of illustration, a single system is shown for each of computer 912 and computer 916. However, with each of each of computer 912 and computer 916, a plurality of computers (not shown) may be interconnected to each other over network 914. For example, a plurality of computers 912 and a plurality of computers 916 may be coupled to network 914. Computers 912 may include data processing systems for communicating with computer 916. Computers 912 may include data processing systems for users whose jobs may require them to build composite AI extraction rules.

Computer 912 can include central processing unit ("CPU") 950, read-only memory ("ROM") 952, random access memory ("RAM") 954, hard drive ("HD") or storage memory 956, and input/output device(s) ("I/O") 958. I/O 958 can include a keyboard, monitor, printer, electronic pointing device (e.g., mouse, trackball, stylus, etc.), or the like. Computer 912 can include a desktop computer, a laptop computer, a personal digital assistant, a cellular phone, or nearly any device capable of communicating over a network.

Likewise, computer 916 may include CPU 960, ROM 962, RAM 964, HD 966, and I/O 968. Computer 916 may provide AI services such as language detection, image analysis, named entity extractor, semantic metadata extraction, summarization, speech-to-text, etc. to computer 912 over network 914. In some embodiments, database 918 may be configured for storing composite AI results and/or rules.

Each of the computers in FIG. 9 may have more than one CPU, ROM, RAM, HD, I/O, or other hardware components. For the sake of brevity, each computer is illustrated as having one of each of the hardware components, even if more than one is used. Each of computers 912 and 916 is an example of a data processing system. ROM 952 and 962; RAM 954 and 964; HD 956 and 966; and databases 918 can include media that can be read by CPU 950 or 960. Therefore, these types of memories include non-transitory computer-readable storage media. These memories may be internal or external to computers 912 or 916.

Portions of the methods described herein may be implemented in suitable software code that may reside within ROM 952 or 962; RAM 954 or 964; or HD 956 or 966. In addition to those types of memories, the instructions in an embodiment disclosed herein may be contained on a data storage device with a different computer-readable storage medium, such as a hard disk. Alternatively, the instructions may be stored as software code elements on a data storage array, magnetic tape, floppy diskette, optical storage device, or other appropriate data processing system readable medium or storage device.

Those skilled in the relevant art will appreciate that the invention can be implemented or practiced with other computer system configurations, including without limitation multi-processor systems, network devices, mini-computers, mainframe computers, data processors, and the like. The invention can be embodied in a computer or data processor that is specifically programmed, configured, or constructed to perform the functions described in detail herein. The invention can also be employed in distributed computing environments, where tasks or modules are performed by remote processing devices, which are linked through a communications network such as a local area network (LAN), wide area network (WAN), and/or the Internet. In a distributed computing environment, program modules or subroutines may be located in both local and remote memory storage devices. These program modules or subroutines may, for example, be stored or distributed on computer-readable media, including magnetic and optically readable and removable computer discs, stored as firmware in chips, as well as distributed electronically over the Internet or over other networks (including wireless networks). Example chips may include Electrically Erasable Programmable Read-Only Memory (EEPROM) chips. Embodiments discussed herein can be implemented in suitable instructions that may reside on a non-transitory computer-readable medium, hardware circuitry or the like, or any combination and that may be translatable by one or more server machines. Examples of a non-transitory computer-readable medium are provided below in this disclosure.

ROM, RAM, and HD are computer memories for storing computer-executable instructions executable by the CPU or capable of being compiled or interpreted to be executable by the CPU. Suitable computer-executable instructions may reside on a computer-readable medium (e.g., ROM, RAM, and/or HD), hardware circuitry or the like, or any combination thereof. Within this disclosure, the term "computer-readable medium" is not limited to ROM, RAM, and HD and can include any type of data storage medium that can be read by a processor. Examples of computer-readable storage media can include, but are not limited to, volatile and non-volatile computer memories and storage devices such as random access memories, read-only memories, hard drives, data cartridges, direct access storage device arrays, magnetic tapes, floppy diskettes, flash memory drives, optical data storage devices, compact-disc read-only memories, and other appropriate computer memories and data storage devices. Thus, a computer-readable medium may refer to a data cartridge, a data backup magnetic tape, a floppy diskette, a flash memory drive, an optical data storage drive, a CD-ROM, ROM, RAM, HD, or the like.

The processes described herein may be implemented in suitable computer-executable instructions that may reside on a computer-readable medium (for example, a disk, CD-ROM, a memory, etc.). Alternatively, the computer-executable instructions may be stored as software code components on a direct access storage device array, magnetic tape, floppy diskette, optical storage device, or other appropriate computer-readable medium or storage device.

While in embodiments disclosed herein, Python is the main language for building rule scripts, other suitable programming language can be used to implement the routines, methods or programs of embodiments of the invention described herein, including C, C++, Java, JavaScript, HTML, or any other programming or scripting code, etc. Other software/hardware/network architectures may be used. For example, the functions of the disclosed embodiments may be implemented on one computer or shared/ distributed among two or more computers in or across a network. Communications between computers implementing embodiments can be accomplished using any electronic, optical, radio frequency signals, or other suitable methods and tools of communication in compliance with known network protocols.

Different programming techniques can be employed such as procedural or object oriented. Any particular routine can execute on a single computer processing device or multiple computer processing devices, a single computer processor or multiple computer processors. Data may be stored in a single storage medium or distributed through multiple storage mediums, and may reside in a single database or multiple databases (or other data storage techniques). Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps and operations described herein can be performed in hardware, software, firmware or any combination thereof.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention.

It is also within the spirit and scope of the invention to implement in software programming or code any of the steps, operations, methods, routines or portions thereof described herein, where such software programming or code can be stored in a computer-readable medium and can be operated on by a processor to permit a computer to perform any of the steps, operations, methods, routines or portions thereof described herein. The invention may be implemented by using software programming or code in one or more digital computers, by using application specific integrated circuits, programmable logic devices, field programmable gate arrays, optical, chemical, biological, quantum or nanoengineered systems, components and mechanisms may be used. The functions of the invention can be achieved by distributed or networked systems. Communication or transfer (or otherwise moving from one place to another) of data may be wired, wireless, or by any other means.

A "computer-readable medium" may be any medium that can contain, store, communicate, propagate, or transport the program for use by or in connection with the instruction execution system, apparatus, system, or device. The computer-readable medium can be, by way of example only but not by limitation, an electronic, magnetic, optical, electromagnetic, infrared, or semiconductor system, apparatus, system, device, propagation medium, or computer memory. Such computer-readable medium shall generally be machine readable and include software programming or code that can be human readable (e.g., source code) or machine readable (e.g., object code). Examples of non-transitory computer-readable media can include random access memories, read-only memories, hard drives, data cartridges, magnetic tapes, floppy diskettes, flash memory drives, optical data storage devices, compact-disc read-only memories, and other appropriate computer memories and data storage devices. In an illustrative embodiment, some or all of the software components may reside on a single server computer or on any combination of separate server computers. As one skilled in the art can appreciate, a computer program product implementing an embodiment disclosed herein may comprise one or more non-transitory computer-readable media storing computer instructions translatable by one or more processors in a computing environment.

A "processor" includes any, hardware system, mechanism or component that processes data, signals or other information. A processor can include a system with a central processing unit, multiple processing units, dedicated circuitry for achieving functionality, or other systems. Processing need not be limited to a geographic location, or have temporal limitations. For example, a processor can perform its functions in "real-time," "offline," in a "batch mode," etc. Portions of processing can be performed at different times and at different locations, by different (or the same) processing systems.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited only those elements but may include other elements not expressly listed or inherent to such process, product, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, a term preceded by "a" or "an" (and "the" when antecedent basis is "a" or "an") includes both singular and plural of such term, unless clearly indicated otherwise (i.e., that the reference "a" or "an" clearly indicates only the singular or only the plural). Also, as used in the description herein, the meaning of "in" includes "in" and "on" unless the context clearly dictates otherwise.

It will also be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/figures should be considered only as exemplary, and not limiting, unless otherwise specifically noted. The scope of the disclosure should be determined by the following claims and their legal equivalents.

What is claimed is:

1. A method, comprising:
    performing, by a computer at a first layer of processing, a first operation on input data, the first operation producing metadata about the input data;
    applying, by the computer at a second layer of processing, a rule to the input data, wherein the second layer of processing comprises a plurality of modules, wherein a rules builder executing on the computer is utilized to define a set of rules which includes the rule, said defining comprising defining whether the rule is processed before or after the plurality of modules, defining an order of the set of rules, and defining whether to apply visual analytical information to unstructured text in the input data, the rule having a rule condition and a rule action, wherein the rule condition includes the metadata produced by the first operation, wherein the rule action includes a second operation, wherein application of the rule comprises performing the rule action responsive to the rule condition being met, resulting in a composite of the metadata and new information about the input data, the new information including deduced metadata, validated metadata, enriched metadata, or a combination thereof; and providing, by the computer, the deduced metadata, the validated metadata, the enriched metadata, or a combination thereof to a facility downstream from the second layer of processing.

2. The method according to claim 1, wherein the rule further includes a rule trigger, the rule trigger identifying an event, a named entity, a date, or a number tagged in the input data.

3. The method according to claim 1, wherein the first operation comprises a natural language processing (NLP) operation, a concept extraction (CE) operation, a named entity extraction (N-EE) operation, a text classification (TC) operation, a natural language understanding (NLU) operation, a sentiment analysis (SA) operation, an extract, transform, load operation, an Internet-of-Things operation, or a web service.

4. The method according to claim 3, wherein the second operation comprises a NLP operation, a CE operation, a N-EE operation, a TC operation, a NLU operation, or a SA operation.

5. The method according to claim 1, wherein the deduced metadata comprises information deduced from multiple pieces of metadata from the first operation, wherein the validated metadata comprises a named entity that contextually validates the metadata from the first operation, wherein the enriched metadata comprises attributes describing the metadata from the first operation.

6. The method according to claim 1, wherein the metadata produced by the first operation comprises text mining metadata, system metadata, or editorial metadata and wherein the text mining metadata comprises natural language processing (NLP) metadata, a concept, a named entity, a keyword, a phrase, a classification, natural language understanding (NLU) metadata, a sentiment, a tonality, an emotion, or an intention.

7. A system, comprising:
a processor;
a non-transitory computer-readable medium; and
stored instructions translatable by the processor for:
performing, at a first layer of processing, a first operation on input data, the first operation producing metadata about the input data;
applying, at a second layer of processing, a rule to the input data, wherein the second layer of processing comprises a plurality of modules, wherein a rules builder executing on the processor is utilized to define a set of rules which includes the rule, said defining comprising defining whether the rule is processed before or after the plurality of modules, defining an order of the set of rules, and defining whether to apply visual analytical information to unstructured text in the input data, the rule having a rule condition and a rule action, wherein the rule condition includes the metadata produced by the first operation, wherein the rule action includes a second operation, wherein application of the rule comprises performing the rule action responsive to the rule condition being met, resulting in a composite of the metadata and new information about the input data, the new information including deduced metadata, validated metadata, enriched metadata, or a combination thereof; and
providing the deduced metadata, the validated metadata, the enriched metadata, or a combination thereof to a facility downstream from the second layer of processing.

8. The system of claim 7, wherein the rule further includes a rule trigger, the rule trigger identifying an event, a named entity, a date, or a number tagged in the input data.

9. The system of claim 7, wherein the first operation comprises a natural language processing (NLP) operation, a concept extraction (CE) operation, a named entity extraction (N-EE) operation, a text classification (TC) operation, a natural language understanding (NLU) operation, a sentiment analysis (SA) operation, an extract, transform, load operation, an Internet-of-Things operation, or a web service.

10. The system of claim 9, wherein the second operation comprises a NLP operation, a CE operation, a N-EE operation, a TC operation, a NLU operation, or a SA operation.

11. The system of claim 7, wherein the deduced metadata comprises information deduced from multiple pieces of metadata from the first operation, wherein the validated metadata comprises a named entity that contextually validates the metadata from the first operation, wherein the enriched metadata comprises attributes describing the metadata from the first operation.

12. The system of claim 7, wherein the metadata produced by the first operation comprises text mining metadata, system metadata, or editorial metadata and wherein the text mining metadata comprises natural language processing (NLP) metadata, a concept, a named entity, a keyword, a phrase, a classification, natural language understanding (NLU) metadata, a sentiment, a tonality, an emotion, or an intention.

13. A computer program product comprising a non-transitory computer-readable medium storing instructions translatable by a processor for:
performing, at a first layer of processing, a first operation on input data, the first operation producing metadata about the input data;
applying, at a second layer of processing, a rule to the input data, wherein the second layer of processing comprises a plurality of modules, wherein a rules builder executing on the processor is utilized to define a set of rules which includes the rule, said defining comprising defining whether the rule is processed before or after the plurality of modules, defining an order of the set of rules, and defining whether to apply visual analytical information to unstructured text in the input data, the rule having a rule condition and a rule action, wherein the rule condition includes the metadata produced by the first operation, wherein the rule action includes a second operation, wherein application of the rule comprises performing the rule action responsive to the rule condition being met, resulting in a composite of the metadata and new information about the input data, the new information including deduced metadata, validated metadata, enriched metadata, or a combination thereof; and
providing the deduced metadata, the validated metadata, the enriched metadata, or a combination thereof to a facility downstream from the second layer of processing.

14. The computer program product of claim 13, wherein the rule further includes a rule trigger, the rule trigger identifying an event, a named entity, a date, or a number tagged in the input data.

15. The computer program product of claim 13, wherein the first operation comprises a natural language processing (NLP) operation, a concept extraction (CE) operation, a named entity extraction (N-EE) operation, a text classification (TC) operation, a natural language understanding (NLU) operation, a sentiment analysis (SA) operation, an extract, transform, load operation, an Internet-of-Things operation, or a web service.

16. The computer program product of claim 15, wherein the second operation comprises a NLP operation, a CE operation, a N-EE operation, a TC operation, a NLU operation, or a SA operation.

17. The computer program product of claim 13, wherein the deduced metadata comprises information deduced from multiple pieces of metadata from the first operation, wherein the validated metadata comprises a named entity that contextually validates the metadata from the first operation, wherein the enriched metadata comprises attributes describing the metadata from the first operation.

18. The computer program product of claim 13, wherein the metadata produced by the first operation comprises text mining metadata, system metadata, or editorial metadata and wherein the text mining metadata comprises natural language processing (NLP) metadata, a concept, a named entity, a keyword, a phrase, a classification, natural language understanding (NLU) metadata, a sentiment, a tonality, an emotion, or an intention.

19. A method for metadata extraction using a composite module extraction engine, comprising:
    receiving content on a server, the server executing the composite module extraction engine;
    defining a plurality of modules for processing metadata from the content;
    executing a composite of the plurality of modules, by the composite module extraction engine, the composite of the plurality of modules comprising at least a first and a second modules of the plurality of modules, said executing comprising:
    importing a set of rules for metadata extraction, wherein the set of rules is defined utilizing a rules builder executing on the server, said defining comprising defining whether a rule is processed before or after the composite of the plurality of modules, defining an order of the set of rules, and defining whether to apply visual analytical information to unstructured text in the content;
    defining an order of operation of the composite of the plurality of modules;
    generating a set of metadata by executing on the content the composite of the plurality of modules in the defined order of operation and according to the set of rules, wherein the first module in the order of operation provides a result to the second module in the order of operation; and
    outputting the set of metadata.

20. The method of claim 19, wherein the plurality of modules comprises a plurality of naturally language processing modules and a plurality of natural language understanding modules.

21. The method of claim 20, wherein the plurality of natural language understanding modules comprises a concept extraction module, a named entity module, and a text classification module, and the plurality of natural language processing modules comprises a sentiment analysis module and a summarization module.

22. The method of claim 20, wherein the plurality of modules further comprises an extract, transform, and load module, an artificial intelligence service module, a text similarity module, a language detection module, and a speech-to-text module.

23. The method of claim 19, wherein the set of metadata comprises deducted metadata, validated metadata, and enriched metadata.

24. The method of claim 19, wherein the plurality of modules process semantic metadata from the content, wherein the imported set of rules are for semantic metadata extraction, and wherein the generated set of metadata is semantic metadata.

25. A system for metadata extraction using a composite module extraction engine, comprising:
    a processor;
    a non-transitory computer-readable medium; and
    stored instructions translatable by the processor for:
    receiving content on a server, the server executing the composite module extraction engine;
    defining a plurality of modules for processing metadata from the content;
    executing a composite of the plurality of modules, by the composite module extraction engine, the composite of the plurality of modules comprising at least two-a first and a second modules of the plurality of modules, said executing comprising:
    importing a set of rules for metadata extraction, wherein the set of rules is defined utilizing a rules builder executing on the server, said defining comprising defining whether a rule is processed before or after the composite of the plurality of modules, defining an order of the set of rules, and defining whether to apply visual analytical information to unstructured text in the content;
    defining an order of operation of the composite of the plurality of modules;
    generating a set of metadata by executing on the content the composite of the plurality of modules in the defined order of operation and according to the set of rules, wherein the first module in the order of operation provides a result to the second module in the order of operation; and
    outputting the set of metadata.

26. The system of claim 25, wherein the plurality of modules comprises a plurality of naturally language processing modules and a plurality of natural language understanding modules.

27. The system of claim 26, wherein the plurality of natural language understanding modules comprises a concept extraction module, a named entity module, and a text classification module and the plurality of natural language processing modules comprises a sentiment analysis module, and a summarization module.

28. The system of claim 26, wherein the plurality of modules further comprises an extract, transform, and load module, an artificial intelligence service module, a text similarity module, a language detection module, and a speech-to-text module.

29. The system of claim 25, wherein the set of metadata comprises deducted metadata, validated metadata, and enriched metadata.

30. The system of claim 26, wherein the plurality of modules process semantic metadata from the content, wherein the imported set of rules are for semantic metadata extraction, and wherein the generated set of metadata is semantic metadata.

\* \* \* \* \*